Nov. 27, 1951
F. ROERIG
2,576,643
SPLIT WING NUT
Filed April 20, 1950
2 SHEETS—SHEET 1
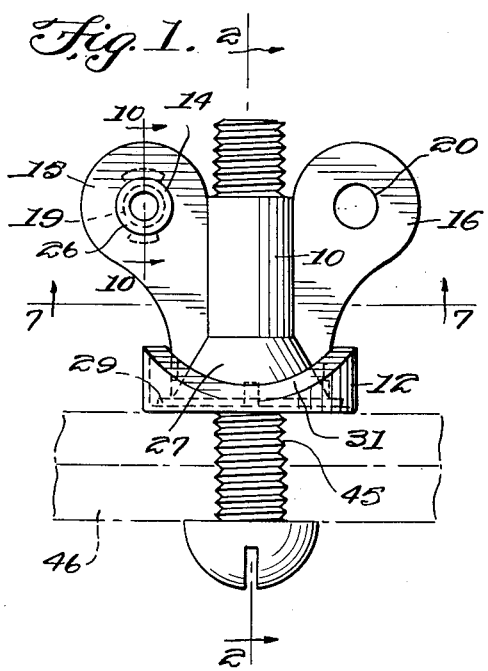
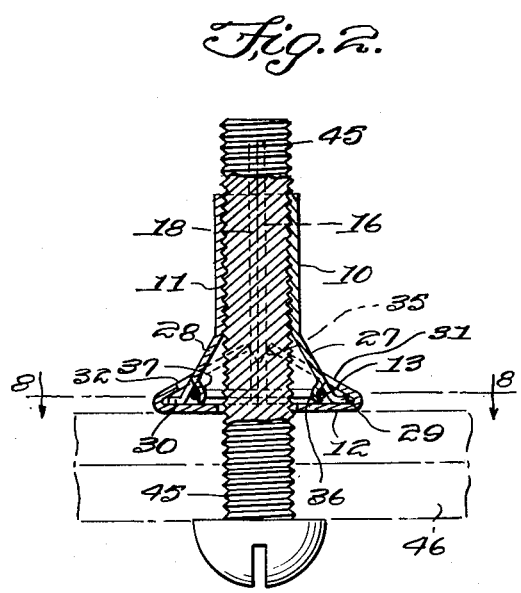
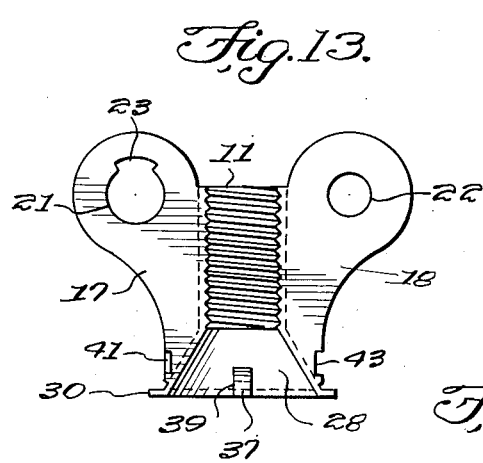
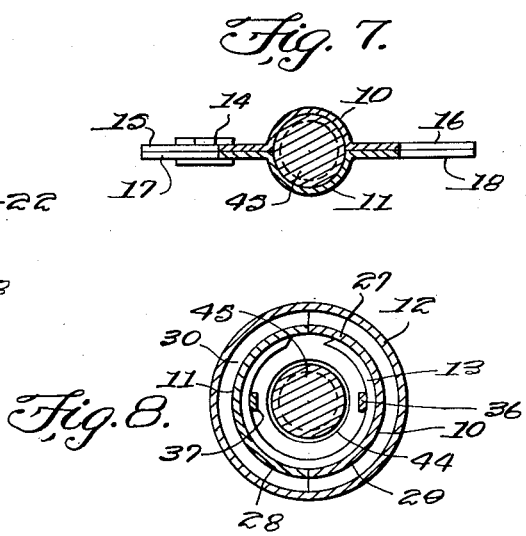
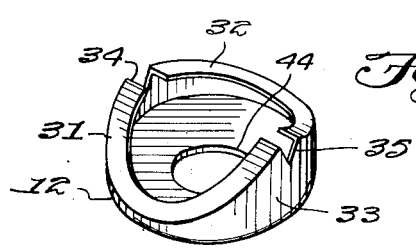
INVENTOR.
Frank Roerig,
BY *Victor J. Evans & Co.*
ATTORNEYS Nov. 27, 1951      F. ROERIG      2,576,643
SPLIT WING NUT
Filed April 20, 1950      2 SHEETS—SHEET 2
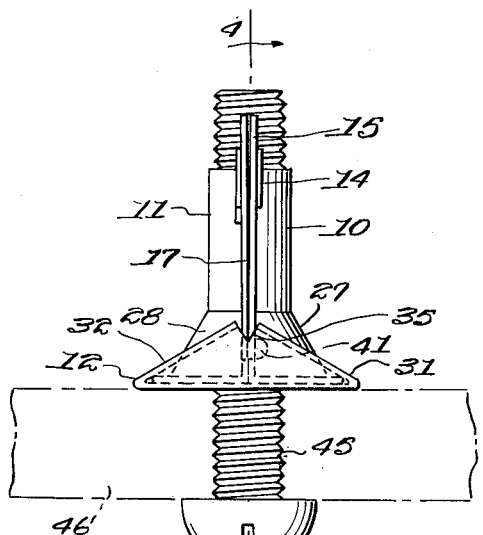
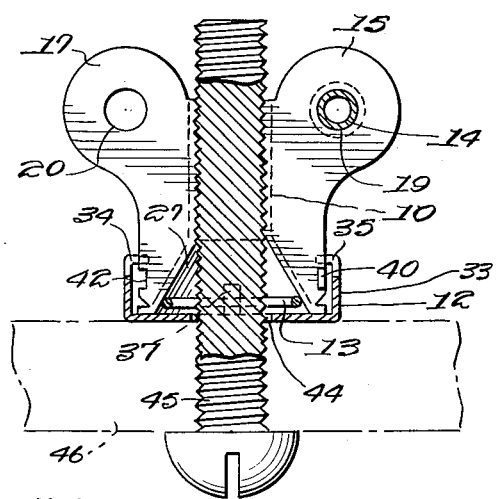
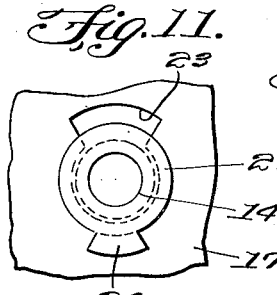
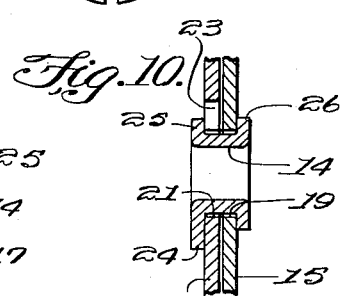
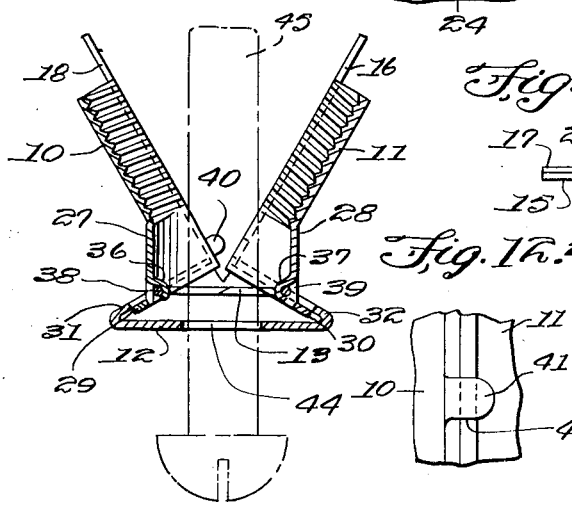
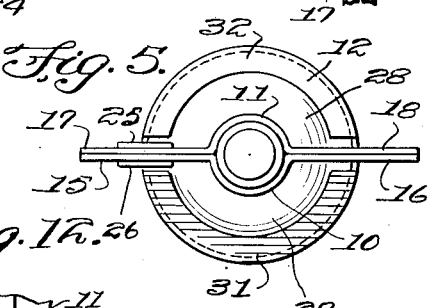
INVENTOR.
Frank Roerig,
BY Victor J. Evans & Co.
ATTORNEYS Patented Nov. 27, 1951

2,576,643

UNITED STATES PATENT OFFICE 2,576,643

SPLIT WING NUT

Frank Roerig, New London, Ohio

Application April 20, 1950, Serial No. 157,131

2 Claims. (Cl. 85—32)

This invention relates to nuts of the type actuated by the thumb and forefingers of the hand and commonly known as thumb or wing nuts, and in particular a wing nut split vertically or longitudinally providing two complementary sections and the sections are hingedly connected at the lower or inner ends by a split spring ring and a surrounding cup shaped washer.

The purpose of this invention is to provide a wing nut that may be readily applied and that may be removed without completely unscrewing the nut from the thread of the screw.

For some uses it is desirable to place a nut on a screw without turning the nut completely along the screw and in many instances it is also desirable to provide a nut that may readily be removed from the screw. With this thought in mind this invention contemplates a split wing nut with means locking the nut in the closed position and in which the locking means is actuated to readily release the sections of the nut whereby the threaded parts of the nut are separable from the thread of a screw or bolt over which the nut is positioned.

The object of this invention is, therefore, to provide a hand actuated or wing nut that is formed whereby the nut may be applied to or removed from a screw without turning.

Another object of the invention is to provide a split wing nut that is adapted to be used in combination with bolts and screws without changing the screws or bolts.

A further object of the invention is to provide a split wing nut which is of a simple and economical construction.

With these and other objects and advantages in view the invention embodies a nut formed of comparatively thin metallic semi-cylindrical elements with wings extended from the edges and with means for hinging the elements together at the opposite ends thereof.

Other features and advantages of the invention will appear from the following description taken in connection with the drawings wherein:

Figure 1 is a side elevational view illustrating the split wing nut and showing the nut positioned on a screw.

Figure 2 is a vertical section through the wing nut taken on line 2—2 of Figure 1 and with part of a screw upon which the nut is positioned also shown in section.

Figure 3 is an elevational view of the wing nut taken at right angles to that shown in Figure 1.

Figure 4 is a vertical section through the wing nut taken on line 4—4 of Figure 3.

Figure 5 is a plan view of the split wing nut.

Figure 6 is a vertical section similar to that shown in Figure 3 illustrating the sections of the wing nut in the open positions and showing a vertical section through the nut.

Figure 7 is a cross section through the wing nut taken on line 7—7 of Figure 1.

Figure 8 is a cross section through the wing nut taken on line 8—8 of Figure 2.

Figure 9 is a detail illustrating the cup-shaped washer in which the lower ends of the sections of the wing nut are hingedly mounted.

Figure 10 is a section taken on line 10—10 of Figure 1 showing a fastener for securing sections of the wing nut together at one side thereof.

Figure 11 is an elevational view looking toward one end of the fastener and showing parts of the wing nut with the edges thereof broken away.

Figure 12 is a detail showing one of the fingers at the sides of the wing nut for holding the sections in position.

Figure 13 is a detail illustrating one of the sections of the wing nut and looking toward the inner face thereof.

Referring now to the drawings wherein like reference characters denote corresponding parts the split wing nut of this invention is formed with complementary sections 10 and 11, a cup shaped washer 12, a split spring ring 13 and a fastener 14.

Each of the sections 10 and 11 is semi-cylindrical in cross sections and the section 10 is provided with extended wings or flanges 15 and 16 which, with the nut in the closed position nest against corresponding flanges 17 and 18 extended from the sides of the section 11. The flanges 15 and 16 are provided with openings 19 and 20, respectively and the flanges 17 and 18 are provided with similar openings 21 and 22.

The opening 21 in the flange 17 of the section 11 of the wing nut is provided with a recess 23 that is positioned to receive a projection 24 on a flange 25 of the fastener 14 and with the fastener freely held in the opening 19 of the flange 15 by a flange 26 on the opposite end of the fastener the fastener may be rotated to the position shown in Figure 10 for locking the two sections of the wing nut together, or turned with the projection 24 in registering relation with the recess 23, to release the sections of the fastener.

The sections 10 and 11 are provided with semiconical shaped inner ends 27 and 28 and the edges thereof are provided with flanges 29 and 30, respectively. The flanges 29 and 30 are held under semi-circular flanges 31 and 32 of the cup-shaped washer 12, the upper edge of the cylindrical wall 33, of which, is provided with recesses 34 and 35 to facilitate inserting the flanged ends of the sections in the washer in assembling the nut.

The sections 27 and 28 are provided with hook-like projections 36 and 37, which are struck from slots 38 and 39 respectively and with the split spring ring 13 positioned in the projections 36 and 37 as shown in Figure 6 the sections 10 and 11 are urged outwardly, as illustrated in Figure 6.

The meeting edges of the parts 27 and 28 of the sections 10 and 11 are provided with positioning means including fingers 40 and 41 extended from the edges of the part 27 and notches 42 and 43 in the edges of the flanges of the part 28 which receives the fingers 40 and 41.

The base of the cup-shaped washer 12 is provided with an opening 44 which receives a bolt or screw, as indicated by the numeral 45, and with the screw extended through an object or objects as indicated by the dotted lines 46 a split wing nut is placed over the outer end of the screw with the parts in the open position, as shown in Figure 6 and when the washer 12 is against the face of the material the sections 10 and 11 are brought together with the projection 24 of the fastener 14 passing through the opening 23 in the flange 17 and the parts are held in this position by turning the fastener so that the projection 24 does not register with the recess 23.

The nut may be turned to obtain a tight grip against the object or material, and the nut may be removed by the same process with the projections 24 turned to register with the recess 23 so that the parts may be opened to the position shown in Figure 6.

It will be understood that modifications may be made in the design and arrangement of the parts without departing from the spirit of the invention.

What is claimed is:

1. A split wing nut comprising two complementary internally threaded semi-cylindrical sections each having wings extended from the sides at one end and outwardly extended flanges on the other, a cup-shaped washer having arcuate inwardly extended flanges on the outer edge thereof in which the flanges of the semi-cylindrical sections are hingedly held, means for urging the ends of the semi-cylindrical sections positioned in the cup-shaped washer together with the outer ends thereof extended outwardly, and means temporarily securing the said outwardly extended ends of the semi-cylindrical sections together.

2. A split wing nut comprising two complementary internally threaded semi-cylindrical sections each having outwardly extended finger gripping flanges on the outer ends and semi-conical shaped sections with outwardly extended flanges at the ends thereof on the inner ends, a cup-shaped washer having arcuate inwardly extended flanges on the outer edges in which the flanges of the semi-conical shaped sections of the semi-cylindrical sections are hingedly mounted, said semi-conical shaped sections having hook-like projections in the ends thereof, a split spring ring positioned in the cup-shaped washer and extended through the said hook-like projections of the semi-conical shaped sections resiliently urging the outer ends of the said semi-cylindrical sections outwardly, said flanges of the said semi-cylindrical sections having registering openings therethrough, and a fastener extended through the openings of the flanges of the said semi-cylindrical sections for temporarily securing the semi-cylindrical sections with the meeting faces thereof in abutting relation.

FRANK ROERIG.

REFERENCES CITED

The following references are of record in the file of this patent:

UNITED STATES PATENTS

| Number | Name | Date |
| --- | --- | --- |
| 561,758 | Brewer | June 9, 1896 |
| 610,308 | Seaman | Sept. 6, 1898 |
| 1,238,695 | Munford | Aug. 28, 1917 |
| 1,705,811 | Eidel | Mar. 19, 1929 |
| 2,367,480 | Beswick | Jan. 16, 1945 |
| 2,392,491 | Moran | Jan. 8, 1946 |

FOREIGN PATENTS

| Number | Country | Date |
| --- | --- | --- |
| 13,357 | Great Britain | July 24, 1900 |
| 394,298 | France | Nov. 21, 1908 |